(12) United States Patent
Imura

(10) Patent No.: US 6,885,704 B1
(45) Date of Patent: Apr. 26, 2005

(54) CODING APPARATUS AND CODING METHOD OF TIME-VARYING IMAGE SIGNAL

(75) Inventor: Koji Imura, Machida (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 530 days.

(21) Appl. No.: 09/787,289

(22) PCT Filed: Jul. 10, 2000

(86) PCT No.: PCT/JP00/04568

§ 371 (c)(1), (2), (4) Date: Mar. 15, 2001

(87) PCT Pub. No.: WO01/08420

PCT Pub. Date: Feb. 1, 2001

(30) Foreign Application Priority Data

Jul. 28, 1999 (JP) ............................................. 11-213808

(51) Int. Cl.$^7$ ................................................. H04B 1/66
(52) U.S. Cl. ........................... 375/240.12; 375/240.14; 375/240.15
(58) Field of Search ......................... 375/240.12–240.29

(56) References Cited

U.S. PATENT DOCUMENTS

| | | | |
|---|---|---|---|
| 5,568,200 A | * 10/1996 | Pearlstein et al. | 375/240.27 |
| 5,680,322 A | 10/1997 | Shinoda | |
| 5,793,895 A | * 8/1998 | Chang et al. | 382/236 |
| 6,487,316 B1 | * 11/2002 | Fukunaga et al. | 382/239 |
| 6,611,561 B1 | * 8/2003 | Hannuksela et al. | 375/240.27 |

FOREIGN PATENT DOCUMENTS

| | | |
|---|---|---|
| EP | 0794671 | 9/1997 |
| JP | 723377 | 1/1995 |
| JP | 7298231 | 11/1995 |
| JP | 7312755 | 11/1995 |
| JP | 7322248 | 12/1995 |
| JP | 8294123 | 11/1996 |
| JP | 9247681 | 9/1997 |
| JP | 10145794 | 5/1998 |
| JP | 10234045 | 9/1998 |
| JP | 1169355 | 3/1999 |

OTHER PUBLICATIONS

Japanese Office Action dated Apr. 15, 2003.
PCT International Search Report dated Oct. 10, 2000.
Bajot, Yann and Habib Mehrez. "GSM EFR Vocoder on a Configurable DSP Core."

* cited by examiner

*Primary Examiner*—Andy Rao
(74) *Attorney, Agent, or Firm*—Stevens, Davis, Miller & Mosher, LLP

(57) ABSTRACT

A picture counter 205 counts and outputs the number of pictures input from the beginning of communication. A coding controlling section 206 outputs coding scheme information for controlling a coding apparatus to perform intra-coding when a counted value on the picture counter 205 is equal to or less than a predetermined value (N), and outputs coding scheme information for motion compensation prediction scheme when the counted value is more than N. Moreover, when the counted value is equal to and less than (N−1), the coding controlling section 206 outputs a signal for controlling a quantization section 210 to make the value of a quantization parameter large to the quantization section 210, and when the counted value is N, the coding controlling section 206 outputs a signal for controlling the quantization section 210 to make the quantization parameter small to the quantization section 210. A switch 207 is switched to "0" in case of the intra-coding and is switched to a frame memory 203 in case of the compensation prediction scheme in conformity with a signal of the coding controlling section 206.

10 Claims, 4 Drawing Sheets

CODING APPARATUS AND CODING METHOD OF TIME-VARYING IMAGE SIGNAL

TECHNICAL FIELD

The present invention relates to a coding apparatus and a coding method of digital time-varying image signals for the use of a TV telephone, a TV conference, and the like. More particularly, the present invention relates to a coding apparatus and a coding method of digital time-varying image signals in image communication on transmission lines on which transmission errors occur. The present invention also relates to a decoding apparatus and a decoding method.

BACKGROUND ART

As a conventional coding method of digital time-varying image signals, there can be cited the coding method in ITU-T (International Telecommunication Union-Telecommunication Standardization Sector) Recommendation H.261 that was recommended in March, 1993. The featured coding method of H. 261 is a motion compensation prediction scheme. The motion compensation prediction scheme is performed as follows.

First, an input image picture and a pre-coded picture are compared, and a motion quantity between them is measured (motion detection). An input image picture is predicted on the basis of the motion quantity and the pre-coded picture. The difference between the predicted image (prediction image) and the input image picture (prediction error signal) is determined, and the prediction error signals and the motion quantity are transmitted to a reception side. Thereby, image information can be transmitted in a small data quantity.

Moreover, in H.261, there is another method different from the motion compensation picture prediction scheme. The method does not use the difference between the prediction image and the input image picture, but the method codes the input image picture itself. The method is called "intra-coding scheme". The intra-coding scheme is used when no pre-coded pictures exist such as the beginning of communication although the generated data quantity is larger than that in the motion compensation prediction scheme, and where the correlation between an input image picture and a pre-coded picture is low and the data quantity is larger than that in the motion compensation prediction scheme.

Moreover, when an transmission error occurs on the transmission lines and a section of images is deteriorated, because the deterioration of the picture quality is propagated to the next picture in turn in the motion compensation prediction scheme in which only the prediction error signal is transmitted, the deterioration of the picture quality can be recovered by using the intra-coding.

Both the motion compensation prediction scheme and the intra-coding scheme divide a picture into blocks (coded blocks), each having 16×16 pixels, and are applied on a per coded block basis. A picture in which all of the coded blocks in it are forcedly intra-coded is called an "intra-picture", and a picture coded in conformity with the motion compensation prediction scheme is called an "inter-picture".

On the other hand, there is a concealment technique for suppressing the deterioration of the picture quality when a transmission error occurs during transmission. The concealment technique is the processing to do voluntarily on the side of the reception, and is not included in the contents of the recommendation. However, by performing the processing, the picture quality deterioration in case of the occurrence of the transmission error can be suppressed. As one of the concealment techniques, there is a method in which when a transmission error occurred and received coded block data can not be decoded correctly, coded block data existing at the same position in the pre-coded picture is output as it is.

Moreover, as one of the concealment techniques, there is a method in which a motion quantity of a coded block that could correctly be decoded and exists at a peripheral position is adopted as the motion quality of the present coded block and a prediction image is generated from a pre-coded picture by the use of the adopted motion quantity and the generated prediction image is output.

When image communication begins, generally, an intra-picture is used as the first picture. This is because a pre-coded picture that becomes always necessary in case of motion compensation prediction coding does not exist at this time.

When a transmission error occurs during the transmission of the first picture, a coding block of a section of the first picture cannot be decoded correctly. In this case, because no pre-coded picture exists, it is impossible to do the concealment processing using a section of the pre-coded picture. Accordingly, the concealment processing of the section of the first picture must be performed by a prescribed value.

As described above, when a transmission error occurs in the first picture, the picture quality deteriorates more severely than the picture quality when concealment processing is performed when a pre-coded picture exists. Moreover, because the motion compensation prediction scheme is used, there is a problem that the deterioration of the picture quality in the first picture is propagated in the second and following pictures with the elapse of time.

DISCLOSURE OF INVENTION

An object of the present invention is to provide a coding apparatus and a coding method of a time-varying image signal that suppress severe picture quality deterioration at the beginning of communication.

A subject matter of the present invention is that a plurality of pictures are continuously (N times) coded in conformity with the intra-coding scheme from the beginning of communication, and that the first (N−1) pictures are transmitted in a coarse picture quality and the last Nth picture is transmitted in a fine picture quality.

BEST MODE FOR CARRYING OUT THE INVENTION

Hereinafter, embodiments of the present invention will be described in detail by reference to the attached drawings.

Embodiment 1

Figure 1:
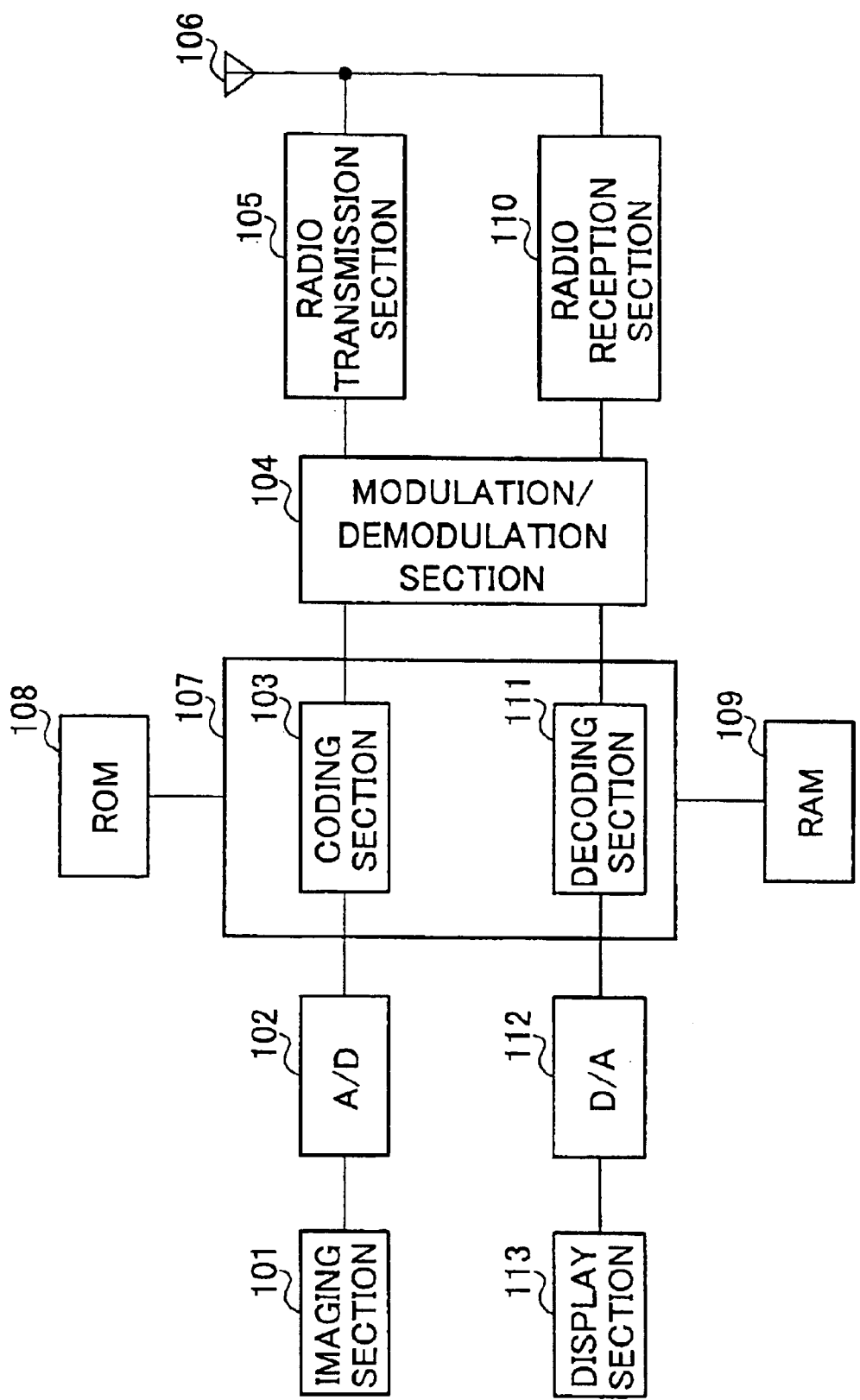
FIG. 1 is a block diagram showing the configuration of a radio communication apparatus equipped with a coding apparatus according to an embodiment of the present invention.

FIG. 1 is a block diagram showing the configuration of a radio communication apparatus equipped with a coding apparatus according to embodiment 1 of the present invention. Here, the "radio communication apparatus" means a communication terminal apparatus and the like such as a base station apparatus and a mobile station in a digital radio communication system. Moreover, the radio communication apparatus may be a portable terminal and may be configured in a form to be used in a state of being connected with a computer.

In the radio communication apparatus, an image is taken in by an imaging section 101 such as a camera on the transmission side, and is output to an A/D transformer 102 as an image signal. In the A/D transformer 102, the image signal is transformed to a digital sound signal, and is output to a coding section 103. The coding section 103 performs the image-coding processing of the digital sound signal, and outputs coded information to a modulation/demodulation section 104. The modulation/demodulation section 104 digitally modulates the coded image signal, and transmits the digitally modulated image signal to a radio transmission circuit 105. The radio transmission circuit 105 performs the prescribed radio transmission processing of the modulated signal. The processed signal is transmitted through an antenna 106. Incidentally, a processor 107 performs its processing by using the data stored in a RAM 109 and a ROM 108 appropriately.

On the other hand, on the reception side of the radio communication apparatus, the prescribed radio reception processing of a signal received by the antenna 106 is performed by a radio reception circuit 110, and the processed signal is transmitted to the modulation/demodulation section 104. The modulation/demodulation section 104 performs the demodulation processing of the received signal, and outputs the demodulated signal to the decoding section 111. The decoding section 111 performs the decoding processing of the demodulated signal to obtain a digital decoded signal, and outputs the digital decoded signal to a D/A transformer 112. The D/A transformer 112 transforms the digital decoded signal output from the decoding section 111 to an analog decoded signal, and outputs the analog decoded signal to a display section 113 such as a display. Finally, the display section 113 displays the image.

Here, the coding section 103 and the decoding section 111 are operated by the processor 107 such as a digital signal processor (DSP) by the use of memories stored in the RAM 109 and the ROM 108. Moreover, the programs for these operations are stored in the ROM 108.

Figure 2:
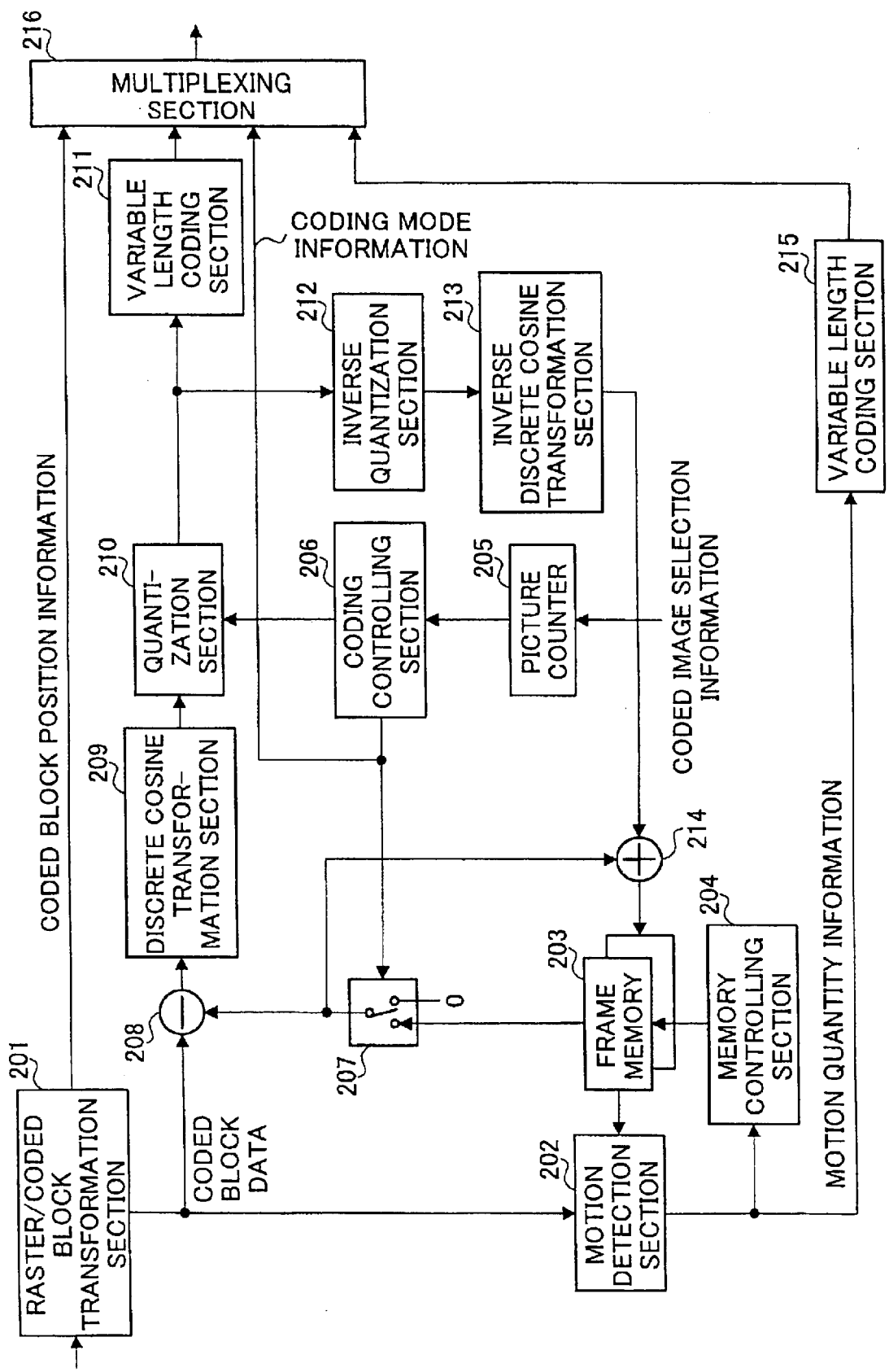
FIG. 2 is a block diagram showing the configuration of the coding apparatus according to the embodiment of the present invention.

FIG. 2 is a block diagram showing the configuration of the coding apparatus of the present invention which is applied to the coding section in the radio communication apparatus shown in FIG. 1.

In FIG. 2, a raster/coded block transformation section 201 transforms obtained image data to a raster/coded block. The position information of the raster/coded block transformed by the raster/coded block transformation section 201 is transmitted to a multiplexing section 216. Moreover, the data of the raster/coded block (the present picture) is transmitted to a motion detection section 202.

The motion detection section 202 detects the motion of the image on the basis of the difference between a previous picture and the present picture. In this case, the previous picture is output from a frame memory 203. memory controlling section 204 controls the output of the reproduced image memorized in the frame memory 203 on the basis of the motion quantity information from the motion detection section 202. Incidentally, the motion quantity information is transmitted to a variable length coding section 215, and is transformed to a Huffman code there and transmitted to the multiplexing section 216.

A picture counter 205 counts the number of pictures. The counted value on the picture counter 205 is transmitted to a coding controlling section 206. The coding controlling section 206 determines on one of the intra-coding mode and the motion compensation prediction mode, and then the coding controlling section 206 outputs the determined coding mode to a switch 207. And the coding controlling section 206 controls a quantization parameter in conformity with the coding mode. This quantization parameter is transmitted to a quantization section 210. Incidentally, the coding mode information is transmitted to the multiplexing section 216.

In the motion compensation prediction scheme mode, a coded block data is compared with the previous picture stored in the frame memory 203 by a subtracter 208, and the difference is transmitted to a discrete cosine transformation section (DCT) 209. Incidentally, in case of the intra-coding mode, the coded block data is transmitted to the discrete cosine transformation section 209.

The data that has received the discrete cosine transformation is transmitted to quantization section 210, and is quantized on the basis of the quantization parameter transmitted from the coding controlling section 206. The quantized data of the DCT coefficient is transmitted to a variable length coding section 211, and is transmitted to an inverse quantization section 212. The variable length coding section 211 transforms the quantized data of the DCT coefficient into a Huffman code, and transmits the Huffman code to the multiplexing section 216.

The quantized data of the DCT coefficient transmitted to the inverse quantization section 212 is inversely quantized and becomes a DCT coefficient and transmitted to an inverse discrete cosine transformation section 213. The inverse discrete cosine transformation section 213 performs the inverse discrete cosine transformation by the use of the DCT coefficient and obtains coded block data corresponding to the difference between the previous picture and the current picture.

An adder 214 obtains the present picture by adding the coded block data and the previous picture, that is, by updating the previous picture in its moved parts. The obtained present picture is transmitted to the frame memory 203 and is stored therein.

The multiplexing section 216 multiplexes the DCT coefficient, the motion quantity information, the position information of the coded block, and the coding mode, and obtains multiplexed data. The multiplexed data is transmitted.

Next, the operations of the coding apparatus having the above configuration will be described.

An input image is divided into coded blocks in a size of, for example, 16×16 pixels in the raster/coded block transformation section 201 and output therefrom. Next, the divided coded block data is transmitted to the motion detection section 202, and is compared with a previous picture in the frame memory 203 therein. Then, the motion quantity of the present coded block (the difference between the previous picture and the present picture) is obtained. The motion quantity information is transmitted to the variable length coding section 215, and is transformed to a Huffman code therein and transmitted to the multiplexing section 216.

The picture counter 205 counts and outputs the number of pictures input from the beginning of communication. The information of the image selected beforehand (the coding image choice information) by a (not shown) processing section for selecting an image to be coded is input into the picture counter 205. The picture counter 205 increases its counting value upon every image information input. Moreover, the picture counter 205 is configured so that the picture counter 205 is automatically reset when the power source of the apparatus is turned on or in an early stage in image transmission.

The switch 207 switches the output of the picture from the frame memory 203 on the basis of the information of the coding scheme of the coding controlling section 206. To put it concretely, in case of the intra-coding scheme, the switch 207 is switched to the side of "0". And, in case of the motion compensation prediction scheme, the switch 207 is switched to the frame memory 203 to make the frame memory 203 output the date of the previous picture to the subtracter 208.

The subtracter 208 obtains the difference between the previous picture and the present coded block data to output the obtained difference value to the discrete cosine transformation section 209. In the discrete cosine transformation section 209, the difference value is changed into a frequency domain, becomes a DCT coefficient, and is transmitted to the quantization section 210. In the quantization section 210, the DCT coefficient is quantized and transmitted to the variable length coding section 211 as a quantized data. In the variable length coding section 211, the quantized data is transformed to a Huffman code. Incidentally, in case of the intra-coding scheme, the difference value becomes the coded block data as it is, and, in case of the motion compensation prediction scheme, the difference value becomes a motion prediction error signal.

In the inverse quantization section 212 and in the inverse discrete cosine transformation section 213, the DCT coefficient of the quantized frequency domain is restructured to the original difference value, added to the previous picture from the frame memory 203, and written in the frame memory 203 for the use of the coding the next picture.

Figure 4:
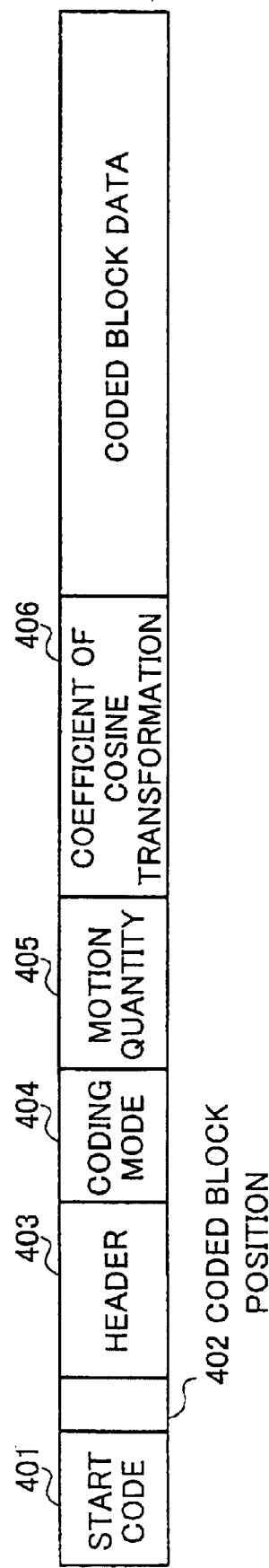
FIG. 4 is a frame configuration diagram of a signal to be used in the radio communication apparatus equipped with the coding apparatus of the present invention.

The coding block data transformed to the Huffman code, the DCT coefficient, the motion quantity information, the coded block position information and the coding scheme are multiplexed to be one data in the multiplexing section 216 and output. For example, in a multiplex data, as shown in FIG. 4, the coded block position information 402 is arranged between a start code 401 and a header 403, and coding scheme information 404, motion quantity information 405 and a coefficient of the cosine transformation 406 are arranged following the header 403.

The coding apparatus of the present invention surely transmits the first image, which is used as a reference image, by transmitting the same image a plurality of times at the beginning of communication or in an early stage in communication by the use of the above-mentioned picture counter. Thereby, the processing of the following steps, i.e. the processing of updating the reference image by the difference from the reference image, is made sure. As a result, it is possible to reduce the deterioration of picture quality on the image reception side.

Next, a transmission control by the picture counter will be described.

The coding controlling section 206 outputs quantization mode information for controlling the coding apparatus of the present invention to perform the intra-coding to the quantization section 210 when the counted value from the picture counter 205 is equal to or less than a predetermined value (N). In this case, because the switch 207 is switched to the "0" side in conformity with an instruction from the coding controlling section 206, the quantization section 210 performs the quantization of the DCT coefficient about the intra-picture.

Moreover, when the counted value on the picture counter 205 is larger than N, the coding controlling section 206 outputs the coding scheme information for controlling the coding apparatus to perform the coding in conformity with the motion compensation prediction scheme to the quantization section 210. In this case, because the switch 207 is switched to the frame memory 203 side in conformity with the instruction from the coding controlling section 206, the quantization section 210 performs the quantization of a DCT coefficient about an inter-picture.

Moreover, the coding controlling section 206 outputs to the quantization section 210 a signal for controlling the coding apparatus to make the value of quantization parameter large, that is, to make the image coarse, when the counted value is equal to or less than (N−1), and to make the value of the quantization parameter small, that is, to make the image fine, when the counted value is N.

For example, when N is three, that is, when the number of times of the plural transmission is three, examples of the coding scheme and the quantization parameter in each picture are shown in the following.

1st picture: Intra-coding scheme, Quantization parameter=31

2nd picture: Intra-coding scheme, Quantization parameter=31

3rd picture: Intra-coding scheme, Quantization parameter=8

4th picture and the following: Motion compensation prediction scheme quantization, Parameter is arbitrary.

(Smaller quantization parameters indicate finer images.)

The picture quality and the number of times of transmission of the image which are transmitted a plurality of times can be determined based on the certainty of the transmission thereof and the data quantity thereof. In consideration of these points, it is preferable that the number of times of transmission is three and only the final image is made fine.

When the difficulty of the occurrence of errors where the number of times of transmission is three is determined, the result becomes as follows. As the preconditions, the following conditions are supposed.

Transmission error rate: 1e−4 (Error of one bit occurs per 10,000 bits on average), Code quantity of a fine picture quality: 16,000 bits, Code quantity of a coarse picture quality: 6, 400 bits.

When the first and the second pictures are coded coarsely and the third picture is coded finely, the code quantity of each picture becomes as follows.

Code quantity of the first picture: 6,400 bits,

Code quantity of the second picture: 6,400 bits,

Code quantity of the third picture: 16,000 bits.

In this case, if the transmission error rate is 1e−4, the probability of the occurrence of a transmission error in the first picture is 6,400 bits×1e−4=0.64. Moreover, if the number of the transmission units (the unit of the transmission where a screen is divided into narrow strips) is nine, the probability that an error occurs in any one of the nine transmission units is 6,400 bits×1e−4×1/9=0.07 when nine transmission units have the same probability that an error occurs in each unit.

Similarly, as for the second picture, too, the probability is 6,400 bits×1e−4×1/9=0.07. As for the third picture, because the code quantity thereof is 16,000 bits, the probability is 16,000 bits×1e−4×1/9=0.18.

The probability that errors occur in the same transmission unit among the nine transmission units at all of three times of transmission is 0.07×0.07×0.18=0.008.

Because, in the conventional coding apparatus, only the first picture is the picture in conformity with the intra-coding scheme and the second and following pictures are pictures in conformity with the motion compensation prediction scheme, the probability that the reference image cannot be used (the probability that a coded block cannot be decoded owing to a transmission error) is 0.18. Therefore, the probability that it becomes impossible to use the reference image is reduced by about 95% in comparison to the conventional coding apparatus.

Incidentally, as for the code quantity, the ratio of the intra-coding scheme (Ia) code quantity (fine), the intra-coding scheme (Ib) code quantity (coarse), and the motion compensation prediction scheme (P) code quantity is about 7:3:1, the code quantities from the beginning of communication through the fourth 4 picture in comparison with the prior art are as follows:

I P P P=7, 1, 1, 1=9 (in the prior art),

Ib Ib Ia P=3, 3, 7, 1=14 (in the present invention).

The present invention shows a 1.5 times increase.

Under the consideration of the increased code quantity and the probability that the first picture cannot be used like that, the number of times of transmission and the picture quality and so on can be determined. Because the generated code quantity depends on input images, these number of times of transmission and the picture quality are appropriately changed.

In the coding apparatus of the present invention, a plurality of pictures are coded in conformity with the intra-coding scheme in sucession (N times) from the beginning of communication, and first (N−1) pictures are transmitted in coarse picture quality, and further the last Nth picture is transmitted in a fine picture quality.

According to the present invention, the probability of never correctly decoding a coded block at the same position is decreased and the propagation of the deterioration of picture quality is prevented by transmitting an intra-picture (N−1) times in succession. Consequently, if there is a coded block that can not be correctly decoded owing to the occurrence of a transmission error in the first picture, the next picture is intra-coded and transmitted, so that, in the next picture, the deterioration in the picture quality of that portion can be recovered unless the coded block at the same position cannot be correctly be decoded owing to a transmission error.

In this case, because the intra-picture has a code quantity larger than that of the inter-picture in conformity with the motion compensation prediction coding scheme, the coding apparatus of the embodiment takes a lot of time necessary for the transmission from the side of transmission to the side of reception. Accordingly the coding apparatus suppresses the code quantity by transmitting the first (N−1) pictures in a coarse picture quality for shortening the transmission time. Moreover, the probability that a transmission error occurs in the (N−1) pictures decreases by making the picture quality of the (N−1) pictures coarse to decrease the code quantity.

Embodiment 2

Figure 3:
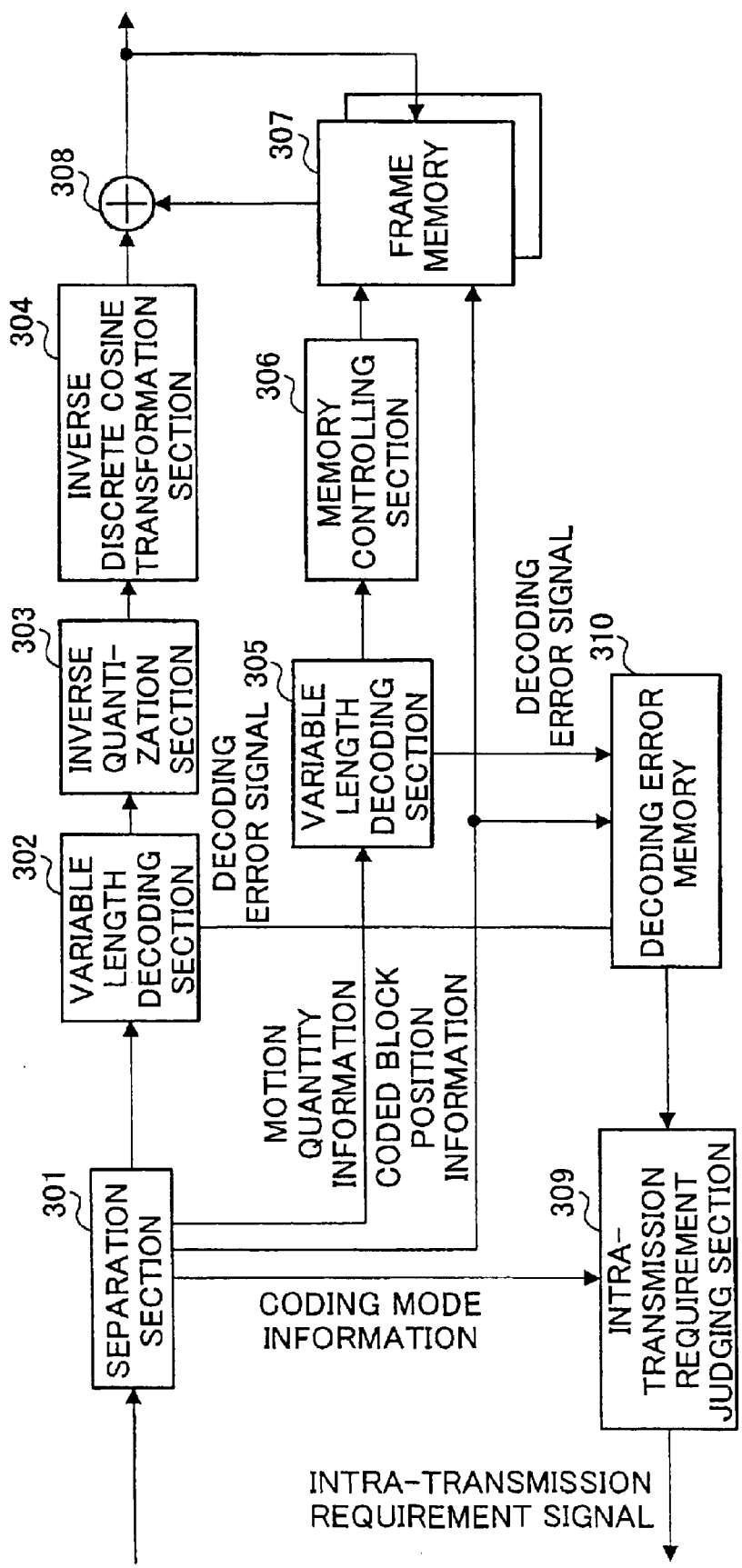
FIG. 3 is a block diagram showing the configuration of a decoding apparatus corresponding to the coding apparatus according to the embodiment of the present invention.

FIG. 3 is a block diagram showing the configuration of a decoding apparatus corresponding to the coding apparatus according to the embodiment 1.

In FIG. 3, a received signal is transmitted to a separation section 301 and separated there to a Huffman code of a DCT coefficient, a Huffman code of motion quantity information, coded block position information, and coding scheme information. The separated codes and information are transmitted to respective processing sections. To put it concretely, the DCT coefficient is transmitted to a variable length decoding section 302; the motion quantity information is transmitted to a variable length decoding section 305; the coded block position information is transmitted to a frame memory 307 and a decoding error memory 310; and the coding scheme information is transmitted to an intra-transmission request judging section 309.

The DCT coefficient coded by the variable length decoding section 302 is transmitted to an inverse quantization section 303 and quantized inversely. The DCT coefficient quantized inversely is transmitted to an inverse discrete cosine transformation section 304, and is used for the inverse discrete cosine transformation there.

The motion quantity information decoded by the variable length decoding section 305 is transmitted to a memory controlling section 306. The memory controlling section 306 controls a picture output from the frame memory 307. Incidentally, when a decoding error occurs in the variable length decoding sections 302, 305, a decoding error signal is transmitted to the decoding error memory 310.

The intra-transmission requirement judging section 309 judges whether or not an intra-transmission request is necessary based on whether or not the picture in which the decoding error occurred is an intra-picture, that is, based on whether or not a coded block exists that was not correctly decoded even once in conformity with the intra-coding scheme, and transmits an intra-transmission request signal to a communication companion.

In the decoding apparatus, the position of a coded block that could not be correctly decoded owing to a transmission error among intra-pictures received from the beginning of communication is memorized in the memory. When a coded block that could not be correctly decoded in conformity with the intra-coding scheme when an inter-picture is first received from the beginning of the communication, the decoding apparatus is controlled to output an intra-picture transmission requirement to the transmission side. To put it concretely, the decoding apparatus checks whether or not a coded block that could not be decoded correctly exists by referring to the memory at the time of detecting an inter-picture first, and judges whether the decoding apparatus outputs an intra-picture transmission request to the transmission side.

This is due to the following reason. That is, when the coded block exists that could not be correctly decoded in conformity with the intra-coding scheme even once at the time of the reception of an inter-picture, no image data is written in the coding block. Consequently, the picture quality of the coded block is severely deteriorated. When the inter-picture is received in spite of the existence of such a coded block, the deterioration of the picture quality is propagated and unseemly images are kept being output.

Accordingly, the position of a coded block that could not be correctly decoded from the beginning of communication in conformity with the intra-coding scheme even once is stored. And if the coded block exists that could not correctly be decoded in conformity with the inter-coding scheme even once when the first inter-picture is received after the beginning of the communication, the decoding apparatus does not decode the inter-picture and requests an intra-picture from the transmission side. Thereby, an intra-picture having no coded block that could not correctly be decoded in conformity with the intra-coding scheme can be obtained, and then the reference to the coded block that could not be decoded in conformity with the intra-coding scheme even once by the inter-picture is obviated. Thereby, the propagation of the severe deterioration of picture quality can be avoided.

Next, the operations of the decoding apparatus having the above configuration will be described.

First, the data transmitted from the transmission side is separated to a Huffman code of a DCT coefficient, a Huffman code of motion quantity information, coded block position information and a coding scheme information by the separation section 301.

The Huffman code of the DCT coefficient is decoded to a DCT coefficient after quantization by the variable length decoding section 302, and is inversely quantized to the DCT coefficient by the inverse quantization section 303. The DCT coefficient which was inversely quantized is transmitted to the inverse discrete cosine transformation section 304, and is used for the inverse discrete cosine transformation there, and then an image data is obtained.

The Huffman code of the motion quantity information, too, is similarly decoded to the motion quantity information by the variable length decoding section 305, and is transmitted to the memory controlling section 306. The memory controlling section 306 determines an address for reading image data from the frame memory 307 on the basis of the motion quantity information.

An output of the frame memory 307 and image data after the inverse discrete cosine transformation are added by the adder 308, and a reproduced image is reproduced. The reproduced image is output and memorized in the frame memory 307 and used for the decoding of the next picture.

The variable length decoding sections 302, 305 severally output a decoding error signal when they detect a code that does not exist as a variable length code owing to a transmission error during decoding. The decoding error memory 310 memorizes the coded block that could not correctly be decoded on a per coded block basis.

The decoding error memory 310 is initialized at a value neither zero nor one, and the value zero is written in the memory 310 to a coded block that was correctly decoded, and the value of one is written in the memory 310 to a coded block in which a decoding error occurred. To a coded block that was once written as zero, the decoding error memory 310 is controlled so as not to write one in it even if a decoding error occurs in the coded block. That is, when a decoding error occurs, the error state of the coded block is read out from the decoding error memory 310. If the error state is zero, the contents of the decoding error memory 310 are not updated. If the error state is the initial value, value one is written in, and if the error state is one, the error state is left as it is.

By such controlling, it becomes possible that a coded block that could correctly be decoded even once in conformity with the intra-coding scheme is not memorized in the decoding error memory 310 even if the coded block cannot correctly be decoded after that.

The intra-transmission request judging section 309 receives the separated coding scheme information, and refers to the decoding error memory 310 when the section 309 receives a first inter-picture after the beginning of reception. When the coding scheme is the intra-coding scheme and a coded block exists that could not correctly decoded even once in the decoding error memory 310, the intra-transmission request judging section 309 outputs an intra-transmission request signal to the transmission side (the side of the communication companion).

Incidentally, if a concealment processing function is provided on the decoding side, because a pre-coded picture for performing the concealment processing already exists and the probability that a coded block at the same position cannot be correctly decoded (N−1) times in succession is very low even if a transmission error occurs at the time of receiving the Nth picture, so that severe picture quality deterioration can be avoided.

By the execution of such control, an intra-picture that has no coded block that could not be correctly decoded in conformity with the intra-coding scheme even once can be obtained, and the reference to the coded block that could not correctly be decoded in conformity with the intra-coding scheme even once by the inter-picture is obviated, thereby avoiding the propagation of the severe deterioration of picture quality.

The interactive image communication becomes possible by the configuration providing the above-mentioned coding apparatus and the decoding apparatus of the present invention and by the use of the configuration on both of the transmission side and the reception side.

Incidentally, although the time-varying image coding/decoding according to above-described embodiments 1 and 2 are described as the time-varying image coding apparatus/the time-varying image decoding apparatus, these time-varying image coding/decoding may be configured as software. For example, the coding apparatus and the decoding apparatus may be configured such that a program of the time-varying image coding/decoding programs is stored in a ROM and executed by instructions of CPU. Moreover, the software may be read out from a medium storing the software, and the time-varying image coding/decoding may be executed by a computer. In such a case, too, the same operations and effects as those in the embodiments 1, 2 are developed.

Although a case using radio transmission lines susceptible to errors during transmission is described, the present invention may also be applied to a case using wire transmission lines. The present invention especially develops its effects in radio image communication terminals.

The coding apparatus of the present invention is configured with an intra-coding section for performing intra-coding that codes a coding block as it is, the coding block being formed with a plurality of blocks a time-varying image signal is divided into, and a coding controlling section for controlling the coding such that the intra-coding is performed for N pictures from the beginning of communication in succession.

According to the configuration, the probability of never correctly decoding a coded block at the same position is decreased, and the propagation of the deterioration of picture quality is prevented by transmitting an intra-picture (N−1) times in succession. Consequently, if there is a coded block that can not be correctly decoded owing to a transmission error in the first picture, the next picture is intra-coded and transmitted, so that, in the next picture, the deterioration in the picture quality of that portion can be recovered unless the coded block at the same position cannot be correctly be decoded owing to a transmission error.

The coding apparatus of the present invention has a configuration in which the coding controlling section makes the picture quality of (N−1) pictures from the beginning of communication relatively coarse and makes the picture quality of N pictures from the beginning of the communication relatively fine.

According to the configuration, a code quantity can be reduced and transmission time can be shortened. Thereby, the probability of the occurrence of a transmission error in a picture can be decreased.

A decoding apparatus of the present invention has: a decoding section for decoding an image-coded data; a memorizing section for memorizing position information of a coded block in a time-varying image signal, the coded block corresponding to an image-coded data that could not correctly be decoded owing to a transmission error, where the image-coded data is an image-coded data after intra-coding; and a requiring section for ascertaining whether a coded block that could not correctly be decoded even once exists in the memorizing section or not when a first image-coded data after motion compensation prediction coding from the beginning of communication, and requesting transmission of a picture after intra-coding when existence of the coded block that has not been decoded correctly is ascertained.

According to the configuration, an intra-picture which does not have the coding block which could not correctly be decoded in conformity with the intra-coding scheme even once can be obtained, and the propagation of the severe deterioration of image quality can be obviated.

The decoding apparatus of the present invention has a configuration in which the decoding section does not decode the image-coded data after motion compensation prediction coding when the coded block that could not correctly be coded even once exists in the memorizing section when the first image-coded data after the motion compensation prediction coding from the beginning of the communication.

According to the configuration, the reference to the coded block which could not correctly be decoded even once in conformity with the intra-coding scheme by an inter-picture is obviated, thereby avoiding the propagation of the severe deterioration of a picture quality.

A coding method of the present invention has: an intra-coding step of for performing intra-coding that codes a coding block as it is, the coding block being formed with a plurality of blocks a time-varying image signal is divided into, and a coding controlling step of controlling the coding such that the intra-coding is performed for N pictures from the beginning of communication in succession and making the picture quality of (N−1) pictures from the beginning of the communication relatively coarse and the picture quality of N pictures from the beginning of the communication relatively fine.

According to the method, the probability of never correctly decoding a coded block at the same position is decreased and the propagation of the deterioration of picture quality is prevented by transmitting an intra-picture (N−1) times in succession. Consequently, if there is a coded block that can not be correctly decoded owing to the occurrence of a transmission error in the first picture, the next picture is intra-coded and transmitted, so that, in the next picture, the deterioration in the picture quality of that portion can be recovered unless the coded block at the same position cannot be correctly be decoded owing to a transmission error.

A decoding method of the present invention has: a decoding step for decoding an image-coded data; a memorizing step for memorizing position information of a coded block in a time-varying image signal, the coded block corresponding to an image-coded data that could not correctly be decoded owing to a transmission error, where the image-coded data is an image-coded data after intra-coding; and a requiring step for ascertaining whether a coded block that could not correctly be decoded even once exists or not when a first image-coded data after motion compensation prediction coding from a beginning of communication is received, and requesting transmission of a picture after intra-coding when existence of the coded block, which has not been decoded correctly, is ascertained.

According to the method, an intra-picture having no coded block that could not correctly be decoded even once in conformity with the intra-coding scheme can be obtained, thereby avoiding the propagation of the severe deterioration of picture quality.

In the decoding step, the decoding method of the present invention does not decode the image-coded data after motion compensation prediction coding when the coded block that could not correctly be coded even once exists when the first image-coded data after the motion compensation prediction coding from the beginning of the communication is received.

According to the method, the reference to the coded block which could not correctly be decoded even once in conformity with the intra-coding scheme by an inter-picture is obviated, thereby avoiding the propagation of the severe deterioration of picture quality.

As described above, according to the present invention, the probability that a coded block at the same position cannot be correctly decoded in conformity with the intra-coding scheme even once can be suppressed to be low, and the propagation of the severe deterioration of picture quality is obviated. Consequently, it becomes possible to provide an image easy to see even if image transmission using transmission lines on which transmission errors occur is performed.

Moreover, when there are coded blocks at the same position that could not correctly be decoded in conformity with the intra-coding scheme even once, the present invention does not decode an inter-picture. Consequently, the severe deterioration of picture quality is avoided and the propagation of the deterioration is obviated. Thereby an image easy to see can be provided.

This application is based on Japanese Patent Application No. HEI 11-213808 filed on Jul. 28, 1999, entire content of which is expressly incorporated by reference herein.

INDUSTRIAL APPLICABILITY

The present invention can be applied to a communication terminal apparatus such as a base station apparatus and a mobile station in a digital radio communications system.

What is claimed is:

1. A coding apparatus of a time-varying image signal, the coding apparatus comprising:
   an intra-coding section that intra-codes information within a plurality of blocks that are formed by division of a picture within the time-varying image signal; and
   a coding controlling section that controls the intra-coding so that N>1 pictures of the time-varying image signal are successively intra-coded by the intra-coding section from the beginning of a communication, wherein:
   the picture quality of each intra-coded picture is represented by the corresponding intra-coded information, and
   the coding controlling section encodes the N pictures such that the picture qualities of (N−1) pictures, from the beginning of the communication, are more coarse than the picture quality of the Nth picture, from the beginning of the communication.

2. A base station apparatus including a coding apparatus of a time-varying image signal, the coding apparatus comprising:
an intra-coding section that intra-codes information within a plurality of blocks that are formed by division of a picture within the time-varying image signal;
an inter-coding section that inter-picture codes pictures within the time-varying image signal; and
a coding controlling section that controls the intra-coding so that N>1 pictures of the time-varying image signal are successively intra-coded by the intra-coding section from the beginning of a communication, wherein:
the picture quality of each intra-coded picture is represented by the corresponding intra-coded information, and the coding controlling section encodes the N pictures such that the picture qualities of (N−1) pictures, from the beginning of the communication, are more coarse than the picture quality of the Nth picture, from the beginning of the communication.

3. A communication terminal apparatus including a coding apparatus of a time-varying image signal, the coding apparatus comprising:
an intra-coding section that intra-codes information within a plurality of blocks that are formed by division of a picture within the time-varying image signal;
an inter-coding section that inter-picture codes pictures within the time-varying image signal; and
a coding controlling section that controls the intra-coding so that N>1 pictures of the time-varying image signal are successively intra-coded by the intra-coding section from the beginning of a communication, wherein:
the picture quality of each intra-coded picture is represented by the corresponding intra-coded information, and
the coding controlling section encodes the N pictures such that the picture qualities of (N−1) pictures, from the beginning of the communication, are more coarse than the picture quality of the Nth picture, from the beginning of the communication.

4. A decoding apparatus of a time-varying image signal, the decoding apparatus comprising:
a decoding section that decodes image-coded data within the time-varying image signal;
a memorizing section that memorizes position information, within the time-varying image signal, of an intra-coded block of the image-coded data that cannot correctly be decoded by the decoding section due to a transmission error; and
a requesting section that:
determines whether the memorizing section contains position information for any one of a plurality of successive intra-coded blocks that immediately precede a motion compensation encoded block within the time-varying signal, and
transmits a request for a communication partner to communicate, in the time-varying image signal, a picture whose image data is intra-coded when the position information is determined to exist.

5. The decoding apparatus of claim 4, wherein the decoding section does not decode the motion compensation encoded block of image-coded data when the requesting section determines that the memorizing section contains the position information.

6. A base station apparatus including a decoding apparatus of a time-varying image signal, the decoding apparatus comprising:
a decoding section that decodes image-coded data within the time-varying image signal;
a memorizing section that memorizes position information, within the time-varying image signal, of an intra-coded block of the image-coded data that cannot correctly be decoded by the decoding section due to a transmission error; and
a requesting section that:
determines whether the memorizing section contains position information for any one of a plurality of successive intra-coded blocks that immediately precede a motion compensation encoded block within the time-varying signal, and
transmits a request for a communication partner to communicate, in the time-varying image signal, a picture whose image data is intra-coded when the position information is determined to exist.

7. A communication terminal apparatus including a decoding apparatus of a time-varying image signal, the decoding apparatus comprising:
a decoding section that decodes image-coded data within the time-varying image signal;
a memorizing section that memorizes position information, within the time-varying image signal, of an intra-coded block of the image-coded data that cannot correctly be decoded by the decoding section due to a transmission error; and
a requesting section that:
determines whether the memorizing section contains position information for any one of a plurality of successive intra-coded blocks that immediately precede a motion compensation encoded block within the time-varying signal, and
transmits a request for a communication partner to communicate, in the time-varying image signal, a picture whose image data is intra-coded when the position information is determined to exist.

8. A coding method of a time-varying image signal, the coding method comprising:
intra-coding information within a plurality of blocks that are formed by division of a picture within the time-varying image signal; and
controlling the intra-coding so that N>1 pictures of the time-varying image signal are successively intra-coded from the beginning of a communication, wherein the picture quality of each intra-coded picture is represented by the corresponding intra-coded information, wherein:
the picture qualities of (N−1) pictures, from the beginning of the communication, are intra-coded more coarsely than the picture quality of the Nth picture, from the beginning of the communication.

9. A decoding method of a time-varying image signal, the method comprising:
decoding image-coded data within the time-varying image signal;
memorizing position information, within the time-varying image signal, of an intra-coded block of the image-coded data that cannot correctly be decoded due to a transmission error; determining whether position information has been memorized for any one of a plurality of successive intra-coded blocks that immediately precede a motion compensation encoded block within the time-varying signal, and transmitting a request for a communication partner to communicate, in the time-varying image signal, a picture whose image data is intra-coded when the position information has been memorized.

10. The decoding method of claim 9, wherein the detected motion compensation encoded block of image-coded data is not decoded when the position information has been memorized.

* * * * *